United States Patent [19]

Kohlstette et al.

[11] Patent Number: 4,828,865

[45] Date of Patent: May 9, 1989

[54] METHOD OF FOR PRODUCING CITRUS JUICES WITH LOW FINAL PERCENTAGES OF PULP

[75] Inventors: Werner Kohlstette; Peter Schöttler; Friedhelm Siegmann, all of Oelde, Fed. Rep. of Germany

[73] Assignee: Westfalia Separator AG, Oelde, Fed. Rep. of Germany

[21] Appl. No.: 62,283

[22] Filed: Jun. 12, 1987

[30] Foreign Application Priority Data

Jun. 19, 1986 [DE] Fed. Rep. of Germany ....... 3620548

[51] Int. Cl.⁴ ............................................. A23P 1/00
[52] U.S. Cl. ..................................... 426/599; 426/495
[58] Field of Search ............... 426/599, 521, 431, 495, 426/490, 489

[56] References Cited

U.S. PATENT DOCUMENTS

| | | | |
|---|---|---|---|
| 2,115,815 | 5/1938 | Johnson | 426/492 |
| 3,120,442 | 2/1964 | Ostrus | 426/599 |
| 3,150,981 | 9/1964 | Redd | 426/431 |
| 3,346,392 | 10/1967 | Lowe | 426/495 |
| 3,391,009 | 7/1968 | Fehlberg | 426/431 |
| 3,917,867 | 11/1975 | Atkins | 426/521 |
| 4,614,598 | 9/1986 | Zettier | 210/377 |
| 4,695,270 | 9/1987 | Zettier | 210/360.1 |

*Primary Examiner*—Donald E. Czaja
*Assistant Examiner*—Carolyn Paden
*Attorney, Agent, or Firm*—Sprung, Horn, Kramer & Woods

[57] ABSTRACT

A method for producing citrus juices with low final percentages of pulp. A centrifuge is used, with the space in the drum that receives the heavier phase, the phase with a high concentration of pulp, discontinuously emptied of at least some of the pulp through slide-activated extraction openings in the jacket of the drum. The light phase, the clarified juice, is continuously extracted. To ensure that the juice will be clarified considerably more effectively in the centrifuge at low energy and equipment costs, with the throughput increased incrementally, juice with a high concentration of pulp is continuously extracted from the centrifuge through channels or through an annular space that is demarcated on the inside by a large separating disk and that has an inflow opening at the largest inside diameter of the drum.

3 Claims, 2 Drawing Sheets

METHOD OF FOR PRODUCING CITRUS JUICES WITH LOW FINAL PERCENTAGES OF PULP

BACKGROUND OF THE INVENTION

The present invention relates to a method and a device for producing citrus juices with low final percentages of pulp by using a centrifuge wherein the space in the drum that receives the heavier phase, the phase with a high concentration of pulp, is discontinuously emptied of at least some of the pulp through slide-activated extraction openings in the jacket of the drum and the light phase, the clarified juice, is continuously extracted.

After being pressed and preliminarily strained, citrus juice contains from 12 to 15% pulp by volume. The market, however, demands juices that contain from 2 to 8%, and juices intended for infants generally contain less than 2% by volume.

The known method of reducing the level of pulp in citrus juices by means of a centrifuge does not allow the final percentage of pulp to be precisely established. To achieve a very low percentage of pulp as demanded in juices intended for infants and to ensure thorough clarification in the centrifuge, heating the juice before clarification in the centrifuge has already been suggested. This method however increases both energy and equipment costs.

SUMMARY OF THE INVENTION

The main object of the present invention is to improve a method and a device of the aforesaid type for producing citrus juices with low final percentages of pulp to the extent that the juice will be clarified considerably more effectively in the centrifuge at low energy and equipment costs, with the throughput increased incrementally.

This object is attained in accordance with the invention by an improvement wherein juice with a high concentration of pulp is continuously extracted from the centrifuge through channels or through an annular space that is demarcated on the inside by a large separating disk and that has an inflow opening at the longest inside diameter of the drum.

The continuous extraction of juice with a high concentration of pulp from the periphery of the centrifuge space will keep the space, that accommodates the other separating disks and through which the light phase flows, free of juice with a high concentration of pulp considerably longer than previously. This will improve the effectiveness of clarification.

The continuous extraction of juice with a high concentration of pulp from the space in the drum that receives the heavy phase will make it possible to considerably extend the intervals between emptying the receiving space. Since each emptying procedure interrupts the clarification process, extending the intervals between emptying will also help to increase the centrifuge throughput.

The new method and device can be employed to very simply obtain citrus juices with reproduceable final percentages of pulp because the levels can be precisely controlled. The percentage of pulp or degree of opacity are for this purpose measured in the line through which the clarified juice exits from the system and, if deviations from a reference are detected, either the juice with a high concentration of pulp that is continuously extracted from the centrifuge space is returned to the centrifuge-feed line or the space for receiving the heavy have is partly or completely emptied.

The juice with the high concentration can be continuously extracted from the drum over a skimming disk and either supplied to a pulp reservoir or returned to the centrifuge-feed line through pipelines or some can be supplied to the reservoir and some returned to the feed line.

The pulp extracted from the space for receiving the heavy phase can be returned to the feed line subsequent to every partial or total emptying of that space through the slide-activated extraction openings in the jacket of the drum during a delay. The delay can be one or two minutes.

Another object of the invention is to improve the device for carrying out the process. This object is attained by an improvement wherein, to allow continuous extraction of the juice with a high concentration of pulp, the drum is provided with channels or with an annular space demarcated on the inside by a large separating disk and having an inflow opening at the longest inside diameter.

The device can have a control valve for establishing the final percentage of pulp in a pipeline.

Some preferred embodiments of the invention will now be specified with reference to the attached drawings, wherein:

DETAILED DESCRIPTION OF THE PREFERRED EMBODIMENTS

Figure 1:
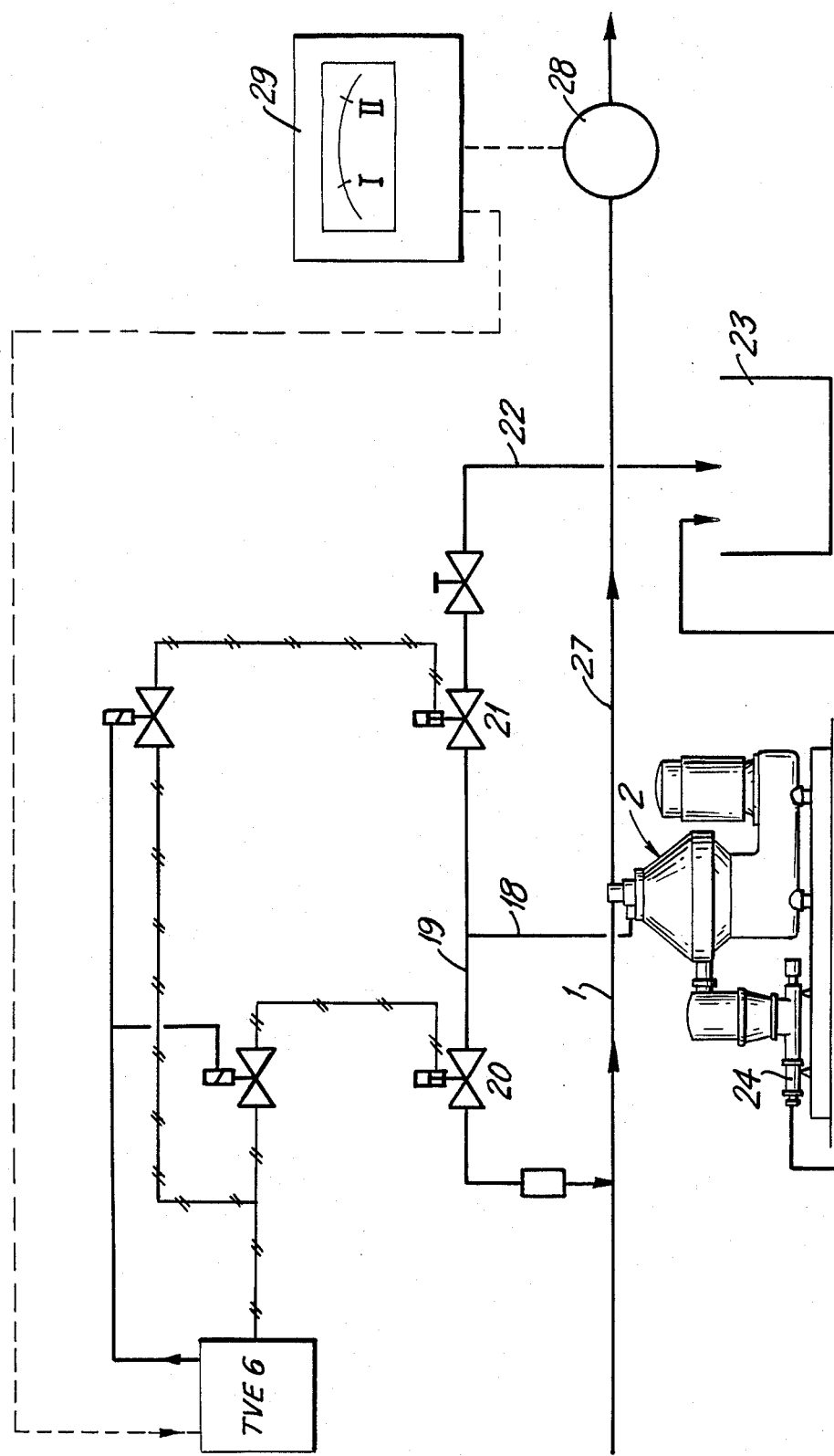
FIG. 1 is a schematic diagram of the method according to the invention.
Figure 2:
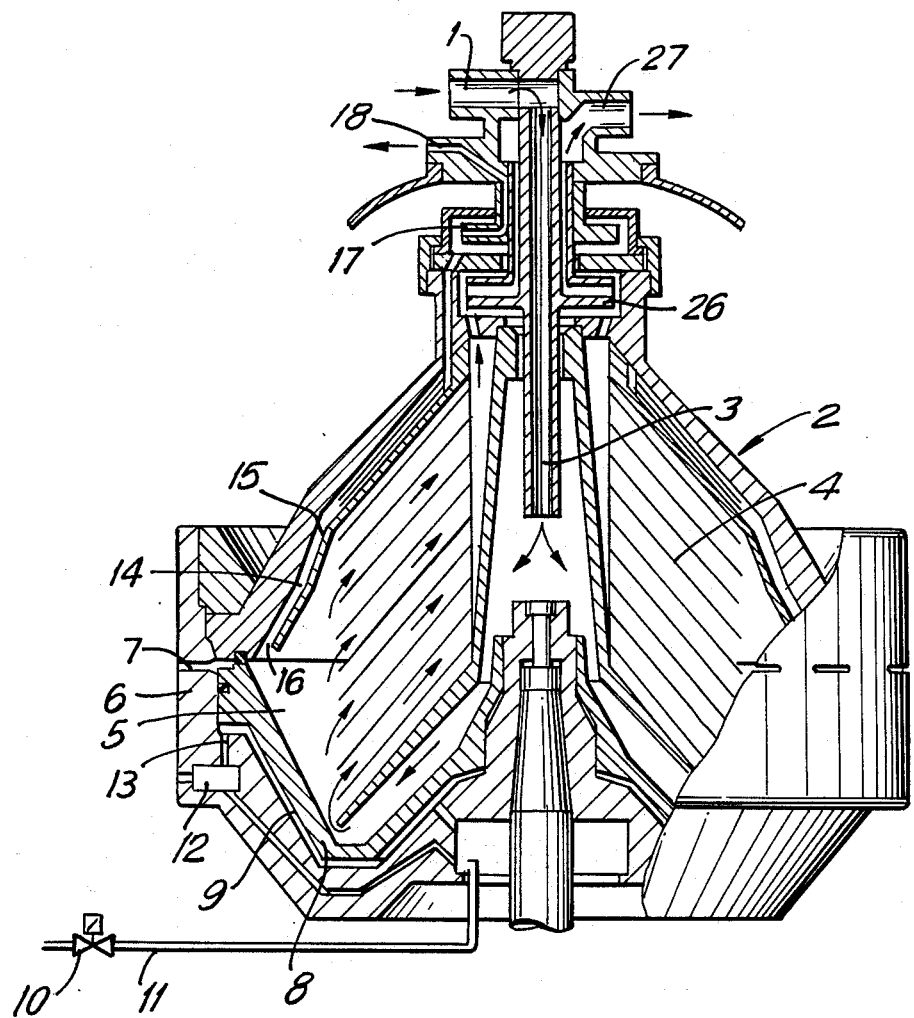
FIG. 2 is a vertical section through the drum of the centrifuge illustrated in FIG. 1.

Referring to FIGS. 1 and 2, citrus juice containing 12 to 15% pulp by volume is supplied through a feed line 1 to the drum 2 of a centrifuge for clarifying. The juice arrives in the centrifuging space of the drum through a central feed pipe 3. The drum is to some extent provided with a stack of disks 4. The space 5 outside disks 4 receives the heavy phase, which consists of juice with a high concentration of pulp. In the bottom 6 of the drum, at the drum's largest inside diameter are extraction openings 7, which are, at the stage of operations illustrated in FIG. 2, closed off by a piston slide 8. The closure chamber 9 associated with piston slide 8 is at this stage full of control water.

The space 5 that receives the heavy phase is partly or completely emptied by closing off a valve 10 in a control-water feed line 11, and by then opening a bleed valve 12, allowing the water in closure chamber 9 to drain through a channel 13. Piston slide 8 moves down subject to the pressure created as the drum fills, and extraction openings 7 are released. The juice with a high concentration of pulp is accordingly extracted from receiving space 5 through openings 7. Once receiving space 5 has been partly or completely emptied, piston slide 8 is returned to its closure position by opening valve 10 and filling closure chamber 9 again.

Juice with a high concentration of pulp is continuously extracted from receiving space 5 through an annular space 14 while the centrifuge is in operation. The inside of annular space 14 is demarcated by a large separating disk 15 and the space has an inflow opening 16 at the largest inside diameter of drum 2. The annular space could be replaced with channels distributed around the circumference of the drum.

The juice with a high concentration of pulp is extracted in the illustrated embodiment over a separating disk 15, into skimming disk 17 and accepted in a line 18. Line 18 empties into a pipeline 19 that contains valves 20 and 21. When valve 21 is closed and valve 20 open, the juice is returned to feed line 1. When valve 20 is closed and valve 21 open, the juice is conveyed into a reservoir 23 through a section 22 of the pipeline. Reservoir 23 also accepts the juice expelled from receiving space 5 through extraction openings 7 when the space is partly or completely emptied. These portions of juice with a high concentration of pulp are conveyed to reservoir 23 through a pipeline 25 by a pump 24.

The clarified juice, which contains a low final percentage of pulp, is extracted over a skimming disk 26 and supplied to an outflow line 27. Line 27 contains a detector 28 that determines the degree of opacity of, and hence the percentage of pulp in, the clarified juice. Associated with opacity detector 28 is a level converter 29. Level converter 29 is provided with a scale. The juice with a high concentration of pulp that is continuously extracted from receiving space 5 is returned to feed line 1 through valve 20 as long as the detected level of opacity remains below a level I.

The range between levels I and II represents the reference, and any results within that range do not activate the controls, and the continuously extracted juice is supplied to reservoir 23 through pipelines 18, 19, and 22.

When detector 28 determines that the opacity of the juice exceeds level II, the space 5 that receives the juice with a high concentration of pulp is partly or completely emptied.

Each emptying is followed by a delay of one to two minutes, during which the continuously extracted juice is returned to feed line 1 through pipelines 18 and 19 and valve 20. This prevents malfunctions resulting from a "fictional" opacity reading occasioned by the impact of the emptying procedure.

Valve 21 could also be a control valve, in which case the downstream manual valve can be eliminated. When the opacity of the citrus juice is below level I, valve 20 will be open and the control valve 21 closed. When level I is attained, valve 20 will close and the control valve will open to some extent. Further opening of the control valve will keep the pulp content at level I as long as possible. Thus, level I corresponds to the reference. Once the control valve is completely open it will no longer respond to increases in the concentration of pulp. Partial or complete emptying of receiving space 5 will be initiated once level II is exceeded.

Whereas the aforesaid method of control demands a wide range between levels I and II, a control valve can be exploited to maintain a prescribed level, with level II being directly adjacent to level I.

It will be appreciated that the instant specification and claims are set forth by way of illustration and not limitation, and that various modifications and changes may be made without departing from the spirit and scope of the present invention.

What is claimed is:

1. A method of obtaining citrus juices with a small residue of pulp, comprising the steps of: supplying citrus juice with 12 to 15% by volume of pulp to a centrifuging space in a centrifuge, continuously extracting a heavy phase with more highly concentrated pulp from a periphery of the centrifuging space, continuously extracting a light phase of citrus juice with a lower concentration of pulp of less than 8% by volume from the center of the centrifuging space; detecting the opacity of the extracted light phase relation to a first and second higher level, returning continuously extracted heavy phase to the centrifuging space when the detected level of opacity is less than the first level, collecting the extracted heavy phase in a reservoir when the detected level of opacity is between the first and second levels and at least partially emptying the periphery of the centrifuging space through slide controlled extraction openings when the detected level of opacity is greater than the second level.

2. The method as in claim 1, wherein juice with a high concentration of pulp continuously extracted from the space is returned to the drum subsequent to every emptying of that space through the slide-activated extraction openings in the jacket of the drum during a delay time.

3. The method as in claim 2, wherein the delay time is one to two minutes.

* * * * *